(12) United States Patent
van Anholt et al.

(10) Patent No.: US 9,044,043 B2
(45) Date of Patent: *Jun. 2, 2015

(54) BALANCED FAT COMPOSITION AND USE THEREOF IN A LIQUID NUTRITIONAL COMPOSITION SUITABLE FOR ENTERAL FEEDING

(75) Inventors: Rogier Daniël van Anholt, Deventer (NL); Zandrie Hofman, Bennekom (NL); Wynette Hermina Agnes Kiers, Zetten (NL)

(73) Assignee: N.V. NUTRICIA, Zoetermeer (NL)

( * ) Notice: Subject to any disclaimer, the term of this patent is extended or adjusted under 35 U.S.C. 154(b) by 267 days.

This patent is subject to a terminal disclaimer.

(21) Appl. No.: 13/514,275

(22) PCT Filed: Dec. 7, 2010

(86) PCT No.: PCT/NL2010/050825
§ 371 (c)(1),
(2), (4) Date: Aug. 7, 2012

(87) PCT Pub. No.: WO2011/071376
PCT Pub. Date: Jun. 16, 2011

(65) Prior Publication Data
US 2012/0309831 A1 Dec. 6, 2012

(30) Foreign Application Priority Data
Dec. 7, 2009 (WO) ................ PCT/NL2009/050741

(51) Int. Cl.
*A61K 31/20* (2006.01)
*A23D 7/00* (2006.01)
*A23L 1/29* (2006.01)
*A23L 1/30* (2006.01)
*A23D 9/00* (2006.01)

(52) U.S. Cl.
CPC ............... *A23L 1/296* (2013.01); *A23D 7/003* (2013.01); *A23L 1/3008* (2013.01); *A23D 9/00* (2013.01); *A23V 2002/00* (2013.01)

(58) Field of Classification Search
CPC ... A23V 2002/00; A23L 1/296; A23L 1/3008
USPC ........................................................ 514/560
See application file for complete search history.

(56) References Cited

U.S. PATENT DOCUMENTS

| 5,223,285 A | 6/1993 | DeMichele et al. |
| 5,403,826 A | 4/1995 | Cope et al. |
| 7,045,143 B1* | 5/2006 | Sawatzki et al. ............... 424/439 |
| 2003/0003194 A1 | 1/2003 | Roussel et al. |

FOREIGN PATENT DOCUMENTS

| DE | 43 04 394 A1 | 9/1993 |
| EP | 0 626 176 A2 | 11/1994 |
| EP | 0 756 827 A2 | 2/1997 |
| EP | 1 964 554 A1 | 9/2008 |
| EP | 1 972 345 A1 | 9/2008 |
| FR | 2 909 839 A1 | 6/2008 |
| WO | WO-94/02166 A1 | 2/1994 |
| WO | WO-02/098242 A1 | 12/2002 |
| WO | WO-2008/046871 A2 | 4/2008 |
| WO | WO-2008/054192 A1 | 5/2008 |

OTHER PUBLICATIONS

Fleith M et al: "Dietary PUFA for Preterm and Term Infants: Review of Clinical Studies", Critical Reviews in Food Science and Nutrition, vol. 45, No. 3, Jan. 1, 2005, pp. 205-229, XP009096126.
International Search Report for PCT/NL2010/050825—mailed May 23, 2011.
International Search Report for PCT/NL2009/050227, dated Jan. 25, 2010.

* cited by examiner

*Primary Examiner* — Paul Zarek
(74) *Attorney, Agent, or Firm* — Gilberto M. Villacorta; Sunit Talapatra; Foley & Lardner LLP (57) ABSTRACT

This invention relates to a balanced fat composition and use thereof in a liquid nutritional composition, in particular suitable for tube feeding. This invention further relates to said liquid nutritional composition for providing enteral nutrition to patients in need thereof, in particular for providing a complete enteral nutrition, in particular for providing a long-term enteral nutrition. More specifically, the balanced fat composition and the liquid nutritional composition comprising said balanced fat composition comprises specific amounts of linoleic acid (LA), alpha-linolenic acid (ALA), docosahexaenoic acid (DHA), eicosapentaenoic acid (EPA), at least one medium chain fatty acid (MCFA), and at least one monounsaturated fatty acid (MUFA). The invention relates further to a method for providing enteral nutrition to patients in need thereof comprising administering an effective amount of said liquid nutritional composition comprising the balanced fat composition according to the invention.

19 Claims, 2 Drawing Sheets

BALANCED FAT COMPOSITION AND USE THEREOF IN A LIQUID NUTRITIONAL COMPOSITION SUITABLE FOR ENTERAL FEEDING

CROSS-REFERENCE TO RELATED APPLICATIONS

This application is a National Stage application of PCT/NL2010/050825, filed Dec. 7, 2010, which claims priority from PCT/NL2009/050741, filed Dec. 7, 2009. These applications are herein incorporated by reference in their entirety.

FIELD OF THE INVENTION

This invention relates to a balanced fat composition and use thereof in a liquid nutritional composition, in particular suitable for tube feeding. This invention further relates to said liquid nutritional composition for providing enteral nutrition to patients in need thereof, in particular for providing a complete enteral nutrition, in particular for providing a long-term enteral nutrition. More specifically, the balanced fat composition and the liquid nutritional composition comprising said balanced fat composition comprises specific amounts of linoleic acid (LA), alpha-linolenic acid (ALA), docosahexaenoic acid (DHA), eicosapentaenoic acid (EPA), at least one medium chain fatty acid (MCFA) and at least one mono-unsaturated fatty acid (MUFA). The invention relates further to a method for providing enteral nutrition to a person in need thereof, comprising administering to said person an effective amount of said liquid nutritional composition comprising the balanced fat composition according to the invention.

BACKGROUND OF THE INVENTION

1. Medical Problem

Patients that rely on medical nutrition as their main or single source of nutrition (tube- and sip-feeding) are vulnerable to dietary deficiencies, but are also more likely to benefit from a healthy and well-balanced nutritional product, as it replaces their regular (potentially less healthy) diet. When the period of use is extended (e.g. in home care situations or nursing homes), the necessity of an optimal and advanced composition becomes even more imperative. Detailed guidelines and requirements for minerals, vitamins, and amino acids are common for medical nutrition; nevertheless, guidelines for the fat composition for complete medical nutrition are rare. In contrast, recommendations for a healthy and balanced intake of fat and fatty acids that are intended for the general public, are widespread. Provided that other rationales for a specific product composition do not interfere (e.g. particular metabolic needs), there is no reason to withhold patients the best possible diet according to the most recent insights.

Due to a variety of reasons, such as diseases, medical conditions, malnutrition, medical disabilities, post-surgery, etc. patients may not be able to obtain the necessary nutrition by ingesting food through the mouth, e.g. orally, by eating or drinking. Therefore, it has been known to provide medical enteral nutrition by oral nutritional supplements or tube feeding. Tube feeding is provided primarily using a device such as a nasogastric feeding tube or a naso-jejunal feeding tube, or by using a percutaneous endoscopic gastrostomy (PEG) or PEG-jejuno-feeding system. In the context of this application, the state of being fed orally by nutritional supplements or a by a feeding tube is called enteral feeding, comprising all of the abovementioned modes, and the nutrition used in such feeding is called enteral nutrition. Use of such enteral nutrition may be temporary for the treatment of acute conditions, or lifelong in the case of chronic disabilities. In the latter case, it is primordial that the enteral nutrition is designed for long-term administration containing all necessary components. With advances in medicine resulting in increased life expectancy and better disease treatment, a large number of patients would benefit from such enteral nutrition designed to provide long-term enteral nutrition.

2. Technical Problem

It is the aim of the invention to provide a balanced fat composition which is suitable to be used in an enteral nutritional composition and which is in accordance with the general recommendations for a healthy and balanced diet. Also, the balanced fat composition comprised in the enteral nutritional composition should be well-tolerated. Furthermore, the enteral nutritional composition comprising said balanced fat composition according to the invention should be easy to administer by tube, i.e. it should have a low viscosity and a low density, it should be pH neutral, have a good shelf stability, not segregate, agglomerate or sedimentate. It should be suitable for heat treatments (such as sterilization and pasteurization) without a substantial change in structure, palatability (especially for oral nutritional compositions), viscosity, etc. The balanced fat composition should be easily mixable with other components, such as a protein fraction, a carbohydrate fraction, a digestible fibre fraction, and other components, e.g. to provide a complete nutritional composition.

To arrive at the invention, the inventors have first established that there are no recommendations for a balanced fat composition for patients in need of enteral medical nutrition. To overcome this problem, the inventors have collected a substantial number of recommendations and/or guidelines for a healthy and balanced dietary fat intake of national and international organizations. From this, the inventors defined a range which is defined by the lowest maximum and the highest minimum of those recommendations. Subsequently, the recommendations (in En %) were redefined in terms of weight % and a suitable fat source was researched, however, not a single fat source was able to fulfill the recommendations. Hence, a composition of fat sources was designed to yield the desired balanced fat composition.

After due consideration, the inventors have found that such balanced fat composition should comprise at least specific amounts of linoleic acid (LA, 18:2n-6), alpha-linolenic acid (ALA, 18:3n-3), docosahexaenoic acid (DHA, 22:6n-3), eicosapentaenoic acid (EPA, 20:5n-3), at least one medium chain fatty acid (MCFA, e.g. 8:0 and/or 10:0), and at least one mono-unsaturated fatty acid (MUFA, e.g. 16:1, 18:1, 20:1, 22:1 and/or 24:1). More in particular, the balanced fat composition contains lower amounts of LA than found in the prior art, in particular in commercial products available from, for example, Abbott, Fresenius, Nestlé, and Nutricia.

Surprisingly, said balanced fat composition could be designed based on common fat sources, could be easily manufactured and could be used for the manufacture of a liquid nutritional composition.

Background Prior Art

EP 1 964 554 A1 (Katry Inversiones) discloses a balanced fat composition suitable for an enteral nutritional composition with a specific lipid profile, to be used in enteral nutrition products. The fat composition differs from our invention in the fact that is comprises 17.2 to 22.8 weight % (target value 19.95 weight %) of LA and 1.7 to 2.4 weight % of ALA (target value 2.28 weight %).

WO 2008/046871 A2 (Nestec SA) discloses long term tube nutrition for specific patient populations, such as elderly. The fat composition disclosed in the examples differs from our invention in several ways (either lower or higher in LA, no EPA and DHA, or higher in EPA and DHA, and lower in ALA, in comparison with the composition according to the present invention).

SUMMARY OF THE INVENTION

In one embodiment, the present invention relates to a fat composition, in particular for use in a nutritional composition suitable for tube feeding, comprising
- 8 to 15 wt %, preferably 12.5 to 14.5 wt %, most preferably 13.5 to 13.9 wt % of linoleic acid (LA, 18:2n-6);
- 3.0 to 6.0 wt %, preferably 4.0 to 5.0 wt %, most preferably 4.3 to 4.7 wt % of a combination consisting of the ω-3 poly-unsaturated fatty acids alpha-linolenic acid (ALA, 18:3n-3), docosahexaenoic acid (DHA, 22:6n-3) and eicosapentaenoic acid (EPA, 20:5n-3) wherein the amount of ALA>2.5 wt %, more preferably >2.7 wt %, or preferably ranges between 2.5 and 4.0 wt %, and the combined amount of DHA and EPA≤2.5 wt %, preferably ≤1.0 wt %;
- 10 to 20 wt %, preferably 14 to 18 wt %, most preferably 15.7 to 16.2 wt % of at least one medium-chain fatty acid (MCFA, e.g. 8:0 and/or 10:0); and
- 35 to 79 wt %, preferably 40 to 70 wt %, most preferably 50 to 60 wt % of at least one mono-unsaturated fatty acid (MUFA, e.g. 16:1, 18:1, 20:1, 22:1 and/or 24:1).

wherein all relative amounts are calculated based on the total amount of fatty acids in the fat composition. The relative amounts do not need to add up to 100 wt % as the balanced fat composition according to the invention may also include other types of fat. However, the balanced fat composition according to the invention should not substantially contain other components which cannot be classified as fats according to the skilled person.

In another embodiment, the present invention relates to a liquid nutritional composition, in particular a complete liquid nutritional composition comprising the balanced fat composition according to the invention. Said liquid nutritional composition is particularly suitable for enteral feeding, in particular for long-term feeding.

Alternatively, the present invention relates to a liquid nutritional composition wherein the fat composition comprises between 30 and 50 En %, preferably between 30 and 40 En % of the total energy of the composition. Said liquid nutritional composition is particularly suitable for enteral feeding, in particular for long-term feeding.

In the context of this application, the % of total energy is also abbreviated as En %; En % is thus short for energy percentage and represents the relative amount that a constituent contributes to the total caloric value of the composition.

In the context of this application, the term "at least" also includes the starting point of the open range. For example, an amount of "at least 95 weight %" means any amount equal to 95 weight % or above.

The invention will now be further elucidated by describing the rationale behind the inventive balanced fat composition according to the invention.

DETAILED DESCRIPTION OF THE INVENTION

Fatty Acid Metabolism

Strictly speaking, the polyunsaturated fatty acids (PUFAs) linoleic acid (18:2n-6, abbreviated as LA, an omega-6 fatty acid) and α-linolenic acid (18:3n-3, abbreviated as ALA, an omega-3 fatty acid) are the only essential fatty acids for humans; all other physiologically and structurally important fatty acids can be derived from these two fatty acids. Nevertheless, the conversion of LA into the longer-chain fatty acid arachidonic acid (20:4n-6, ARA) and the conversion of ALA into eicosapentaenoic acid (20:5n-3, EPA) and docosahexaenoic acid (22:6n-3, DHA) by elongase and desaturase enzymes is not very efficient in humans. Estimates of conversion of LA into ARA and of ALA into EPA vary, but rarely exceed 10%. Moreover, the conversion of ALA into DHA is estimated to be even lower, with estimates varying from 4% to only 0.2% (Gerster 1998; Burdge et al. 2002; Goyens et al. 2006). These fatty acids (ARA, EPA, DHA) not only have important structural roles, but they are also converted into eicosanoids and resolvins with a range of physiological and immunological functions (Tapiero et al. 2002; Calder 2006; Serhan 2006). ARA, EPA, and DHA are called long-chain PUFAs (LCPUFA, PUFAs with a carbon chain length of more than 18) or LCPs, with ARA belonging to the omega-6 LCPUFAs and EPA and DHA belonging to the omega-3 LCPUFAs.

The composition of a diet largely determines the incorporation of these fatty acids into various cells and tissues in a complex way. Most importantly, the fatty acids, either derived from the diet or synthesised from precursors, compete on various levels for the same enzymes that determine the incorporation into tissues and/or conversion into biologically active metabolites: for enzymes that determine (1) incorporation into phospholipids and tissues, (2) the release from membranes and other stores, (3) the conversion into other fatty acids, and (4) the conversion into various metabolites (eicosanoids, resolvins). These eicosanoids and resolvins are involved in a wide variety of physiological and immunological processes, regulate the release of a range of hormones and have an effect on nervous system function. Due to the competition of fatty acids for the converting enzymes, a relative excess in LA consumption will promote the formation of ARA at the expense of EPA and DHA. Similarly, a relative excess in ALA leads to a higher production of EPA and DHA over ARA. Consequently, this will result either in a shift toward ARA-derived metabolites, or to EPA and DHA-derived metabolites. In this way, both the absolute amounts and the ratios between the different fatty acids in the diet affect the structural and regulatory roles of the fatty acids and their metabolites.

Figure 1:
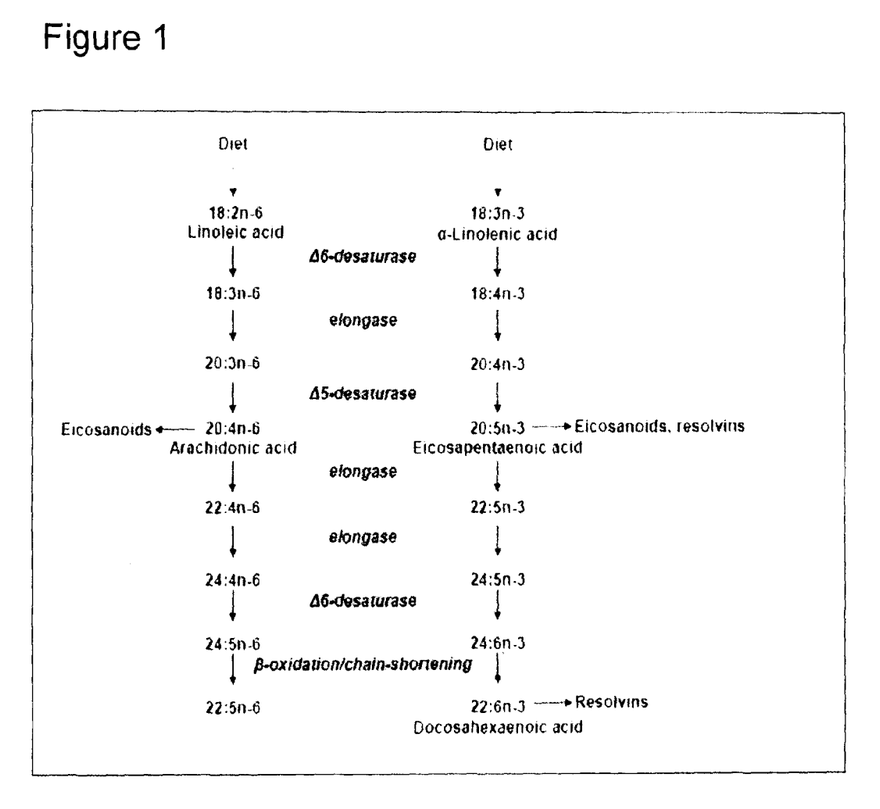
FIG. 1 provides an overview of the metabolism of the various fatty acids ("Table 1").
Figure 2:
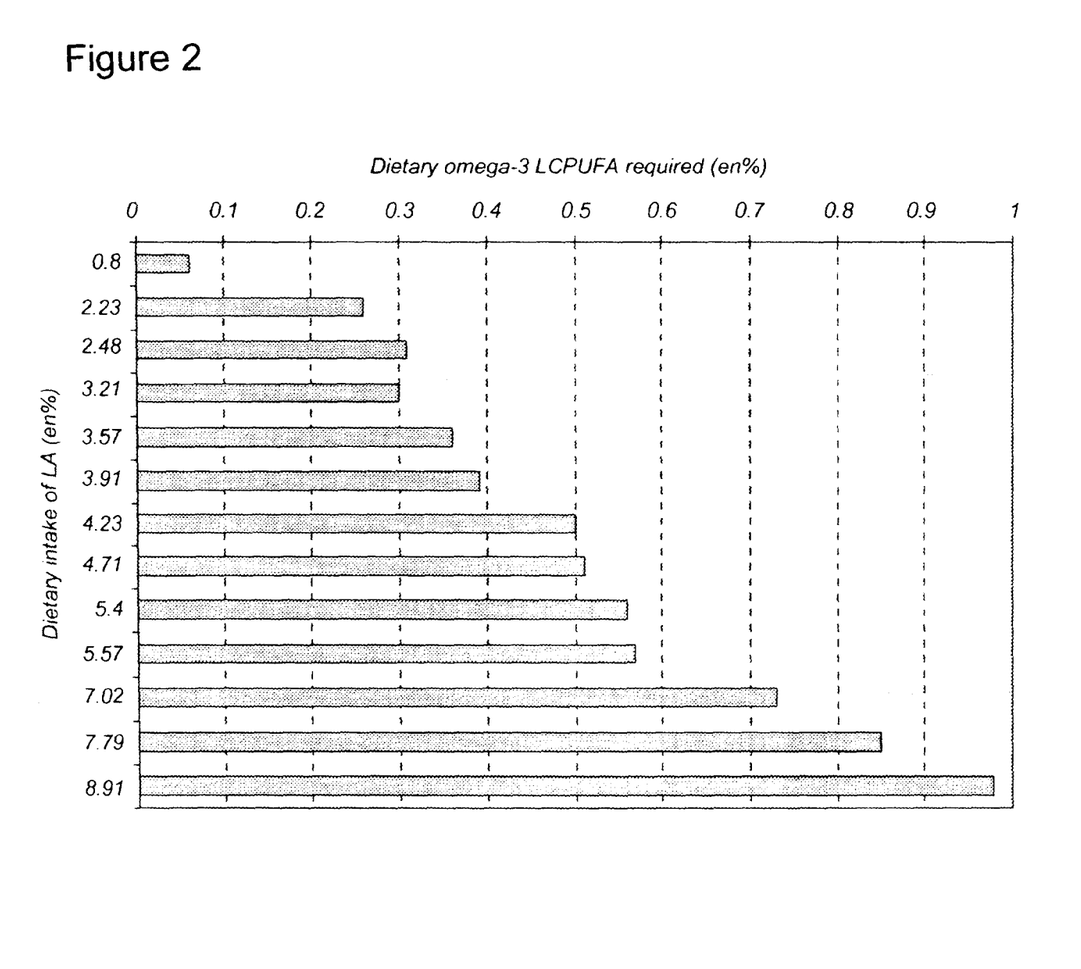
FIG. 2 shows the effect of the background consumption of omega-6 linoleic acid (LA) on the efficiency of dietary supplementation with omega-3 LCPUFAs to reach the target of 50% of the tissue LCPUFAs consisting of omega-3 fatty acids.

FIG. 1 gives a Schematic representation of the metabolism of fatty acids in humans that starts with the two essential fatty acids linoleic acid and α-linolenic acid from dietary (plant) sources. From these fatty acids all other important fatty acids can (theoretically) be derived by enzymatic conversion: desaturation enzymes (Δ5, Δ6) insert new double bounds between carbon atoms and the enzyme elongase adds carbon atoms to the carbon chain.

Overview of the Most Recent Recommendations

Several organizations have published guidelines for the composition of enteral nutrition, addressing the specific dietary needs of particular patient groups. For instance, ESPEN guidelines have been published for a number of patient populations (i.e. Cardiology and Pulmonology; Gastroenterology; Geriatrics; Hepatology; Wasting in HIV; Intensive care; Non-surgical oncology; Renal failure; Surgery and transplantation). However, none of these guidelines specifically address the optimal dietary composition for general enteral nutrition, nor are detailed recommendations for the fat composition included. On the other hand, recommendations for a healthy and balanced diet aimed at the general public are becoming increasingly more detailed as the insight in the role of nutrition in health and particularly prevention of diseases is progressing.

The availability and accessibility combined with the public awareness of healthy nutrition signifies the suitability of these dietary recommendations as a starting point when considering the fat composition of advanced medical nutrition products. Hence, it seems imperative that patients receiving general medical nutrition should benefit from the same dietary compositions that are considered advantageous for the general population. In order to determine the optimal levels of specific (groups of) fatty acids, a detailed comparison was made of the recommendations for a healthy and balanced dietary fat intake of the national and international organizations, which included, among others, the organizations listed below. The list shown is not intended to be complete, but it reflects the range of recommendations that apply to the "Western-type" diet:

Health Council of the Netherlands (Netherlands)
British Nutrition Foundation (U.K.)
Scientific Advisory Committee on Nutrition (U.K.)
Deutsche Gesellschaft für Ernährung (Germany)
Superior Health Council of Belgium (Belgium)
Agence Française de Sécurité des Aliments (AFSSA) & Centre National d'Études et de Recommandations sur la Nutrition et l'Alimentation (CNERNA)—Centre National de la Recherche Scientifique (CNRS) (France)
Società Italiana di Nutrizione Umana (Italy)
American Heart Association Nutrition Committee (U.S.A.)
Food and Agriculture Organization & World Health Organization (FAO/WHO)
International Society for the Study of Fatty Acids and Lipids (ISSFAL).

The view on a healthy fat intake has changed over the past decades, from a reduction of the overall fat intake to more emphasis on the distinction of different types of fat and the acknowledgement of so-called "healthy fats". Scientific insights on what should be considered optimal levels can differ between countries, resulting in a variety of recommendations. Nevertheless, several universal recommendations can be identified:

1. Reduce the total energy intake (in part) by a reduction of the fat intake;
2. Reduce the intake of trans fats (mainly derived from processed foods);
3. Reduce the intake of saturated fats;
4. Reduce the consumption of omega-6 fatty acids, in particular linoleic acid (LA, 18:3n-6);
5. Increase the consumption of long-chain omega-3 fatty acids EPA (20:5n-3) and DHA (22:6n-3), e.g. by increasing the consumption of (fatty) fish to at least 1-2 times per week.

In Table 2 the inventors combined recommendations into the range of what is considered a healthy and balanced intake for fatty acids: while none of the organisations provides recommendations/guidelines for all the aspects of an optimal fat intake as listed in Table 2, the combination of all recommendations/guidelines resulted in the most balanced composition that will comply with all recommendations/guidelines mentioned.

These recommendations are intended for the general (healthy) population with the primary goal to prevent illness and reduce mortality related to dietary practice, for example cardiovascular diseases. Although the fat compositions of current prior art sip and tube feeds correspond for the most part with the recommendations for a healthy and balanced fat intake, several differences can be identified, in general attributed to the incorporation of DHA and EPA, which is generally lacking in prior art products for enteral nutrition, and the LA-content, which is systematically too high in prior art products for enteral nutrition.

Implementation of the Recommendations

The inventors have now found that a balanced fat composition could be designed, taking into account the recommendations for a healthy and balanced fat intake, suitable for enteral nutrition. After due consideration, the following fat composition is proposed, which will be discussed in more detail in the next sections, and which takes into account:

1. Inclusion of a source of EPA and/or DHA: almost all organizations recommend a minimum intake of (fatty) fish of 1-2 times/week, which corresponds to a minimum daily intake of about 500 mg EPA+DHA.
2. Selection of the appropriate fat sources with a low LA content: several organizations recommend a reduction of the intake of LA to a minimum intake of 1 to 4 En % for adults.
3. Inclusion of medium-chain fatty acids (MCFA): adding a source of MCFAs provides an easy and relatively cheap way to reduce the LA content (see point 2 above). In order to reduce the LA content to 4 En %, an equivalent amount of 4 En % of MCFAs might be required (10-20% of the fat composition).
4. Inclusion of a source rich in a mono-unsaturated fatty acid (MUFA), for example, oleic acid (18:1n-9): several organizations recommend minimum or adequate intakes of MUFAs between 10 and 30 En %. Inclusion of sufficient amounts of MUFAs is an excellent way to limit the total saturated fatty acid amount, as well as replace the omega-6 PUFAs mentioned above.

TABLE 2

The combined national and international recommendations from 13 national and international organizations for the intake of different types of fat. Recommendation values are expressed as percentages of the daily caloric food intake; daily intake calculated for 2 caloric diets, when these products are consumed as a full dietary replacement (complete nutrition).

| | Highest minimum-Lowest maximum | Daily intake (g) with a 1500 kcal/day diet | Daily intake (g) with a 2000 kcal/day diet |
|---|---|---|---|
| Total fat | 15-35 En % | 25.0-58.3g | 33.3-77.8 g |
| Saturated fat | Maximum 10 En % | Maximum 16.7 g | Maximum 22.2 g |
| Unsaturated fat | 15.3-33 En% | 25.5-55 g | 34.0-73.3 g |
| MUFA | 10-30 En % | 16.7-50.0 g | 22.2-66.7 g |
| PUFA | 5.3-12 En % | 8.8-20 0 g | 11.8-26.7 g |
| LA | Adequate 4 En % | Adequate 6.7 g | Adequate 8.9 g |
| ALA | Minimum 1 En % | Minimum 1.7 g | Minimum 2.2 g |
| LA/ALA | 2.9:1-4.3:1 | 2.9:1-4.3:1 | 2.9:1-4.3:1 |
| EPA + | Minimum 0.27 En % | Minimum 450 mg | Minimum 600 mg |

TABLE 2-continued

The combined national and international recommendations from 13 national and international organizations for the intake of different types of fat. Recommendation values are expressed as percentages of the daily caloric food intake; daily intake calculated for 2 caloric diets, when these products are consumed as a full dietary replacement (complete nutrition).

|  | Highest minimum-Lowest maximum | Daily intake (g) with a 1500 kcal/day diet | Daily intake (g) with a 2000 kcal/day diet |
|---|---|---|---|
| DHA | Minimum 500 mg/day | Minimum 500 mg | Minimum 500 mg |
| Total ω-6 | 4-8 En % | 6.7-13.3 g | 8.9-17.8 g |
| Total ω-3 | 1.3-2 En % | 2.2-3.3 g | 2.9-4.4 g |
| ω-6/ω-3 | 2.1:1-6.2:1 | 2.1:1-6.2:1 | 2.1:1-6.2:1 |

In the framework of this application, the wording "balanced", "better balanced" and the like is used to indicate that the fat composition according to the invention is a better solution to the recommendations for a healthy and balanced fat intake than the existing, commercially available fat compositions.

1. Inclusion of a Source of EPA and/or DHA

Increasing the consumption of fish oil, high in the omega-3 fatty acids EPA and DHA, has an effect on a range of physiological and immunological processes, including membrane fluidity and functioning and signal transduction pathways. Most importantly, increasing the intake of EPA and DHA reduces the production of proinflammatory mediators such as cytokines, interleukins and tumor necrosis factor (TNF). This is achieved by (1) competition with the omega-6 arachidonic acid (20:4n-6, ARA) for the incorporation into membrane phospholipids, which lowers the ARA content of the cell membranes and hence its availability for eicosanoid synthesis, and (2) by competition for the same enzymes that convert ARA into pro-inflammatory eicosanoids (Calder 2006; Sijben et al. 2007).

Multiple (mechanistic) studies have confirmed that consumption of sufficient fish has the following beneficial effects:
  reduction of serum inflammatory markers (e.g. Zampelas et al. 2005)
  decrease in overall heart rate (e.g. Mozaffarian et al. 2005)
  reduction of blood pressure (e.g. Theobald et al. 2007)
  reduction of fasting and postprandial plasma triglycerides (e.g. Schwellenbach et al. 2006)
  protection against heart arrhythmias, most likely by modulation of myocardial sodium and calcium ion channels (e.g. Chrysohoou et al. 2007).

A large number of interventions with elevated intakes of n-3 PUFA have been published with the objective to reduce symptoms of (and sometimes to treat) diseases related to chronic inflammation, including rheumatoid arthritis, asthma, cancer-associated cachexia, and inflammatory bowel disease. Other diseases that have been found to be influenced by consumption of fish oil fatty acids are, among others, cardiovascular diseases (CVD), macular degeneration, osteoporosis, depression, schizophrenia, Attention Deficit/Hyperactivity Disorder (ADHD), eating disorders, cancer, burns, and skin disorders (Calder 2006).

The composition and purity of the available fish oils vary considerably. Not only are these oils different in the total amount of EPA and DHA, but also the ratio of EPA to DHA is subject to variation (see Table 3). EPA and DHA have different functions in the human body; beneficial effects of EPA are principally contributed to the competitive inhibition of eicosanoid synthesis from ARA, attributes of DHA are often linked to membrane functioning. Despite these differences in functionality, many intervention studies provide very little information on the exact intake of these fatty acids, not in the least because these levels can be difficult to determine in the diet.

TABLE 3

Approximate fatty acid compositions (in grams per 100 gram) of several commonly used fish oils.

|  | Anchovy | Sardine | Tuna |
|---|---|---|---|
| Saturated |  |  |  |
| 14:0 | 9 | 8 | 3 |
| 16:0 | 17 | 18 | 22 |
| Mono-unsaturated |  |  |  |
| 16:1 | 13 | 10 | 3 |
| 18:1 | 10 | 13 | 21 |
| Poly-unsaturated n-3 |  |  |  |
| 20:5n-3 (EPA) | 22 | 16 | 6 |
| 22:6n-3 (DHA) | 9 | 9 | 22 |

Source: "The Lipid Handbook, third edition. 2007. F. D. Gunstone, J. L. Hardwood, A.J. Dijkstra (Eds.). CRC Press, USA.

The most commonly used fish species, i.e. anchovy and sardine, are characterised by a relative excess of EPA over DHA, while in contrast tuna oil is relatively rich in DHA (Table 3). Hence the ratio of EPA vs. DHA depends on the species that is used and the production process largely determines the quantity of these fatty acids. Apart from fish oil, which contains most of the EPA and DHA in the form of triglycerides, EPA and DHA can also be provided as purified ethyl-esters. For example, on e study showed that moderate supplementation with DHA (0.7 g DHA/day, from a purified alga1 source) lowered diastolic blood pressure within 3 months and this effect was more pronounced than obtained by higher doses of EPA and DHA combined in other studies (Theobald et al. 2007). Similarly, supplementation with 1 g/day of DHA was equally effective as 1.25 g EPA+DHA in reducing plasma triglycerides in male elderly after 8 weeks (Davidson et al. 1997). Omega-3 LCPUFAs from ethyl esters and triglycerides are equally well incorporated into plasma lipids, despite any possible differences in the initial timing of absorption (Luley et al. 1990; Hansen et al. 1993).

Dietary LCPUFAs can also be administered in the form of phospholipids, for example derived from eggs. While some studies reported a superior intestinal absorption of omega-3 LCPUFAs from phospholipids compared to triglycerides (Carnielli et al. 1998), others reported similar appearances of LCPUFAs in the plasma lipid fraction and virtually equal rates of incorporation of ARA and DHA in red blood cells from either phospholipids or triglycerides in infants (Sala-Vila et al. 2004; Sala-Vila et al. 2006).

As explained above, dietary α-linolenic acid (ALA) can be converted into long-chain omega-3 fatty acids EPA and DHA via enzymatic conversion. The possibility arises that by increasing the consumption of ALA, the tissue levels of EPA and DHA may be elevated. Rich sources of ALA are plant oils such as linseed oil (about 60% ALA), perilla oil (about 50% ALA), and canola oil (about 10%). However, the conversion of ALA into EPA (less than 10% of dietary ALA) and into DHA (less than 4% of dietary ALA) in adults is not very efficient and is even further reduced by 40-50% with a background diet high in omega-6 PUFAs (Gerster 1998; Williams et al. 2006). This suggests that high intakes of ALA will be required to reach the equivalent of the recommended EPA+DHA intakes per. Hence, the addition of preformed EPA+DHA seems imperative.

In conclusion, increasing the dietary intake of omega-3 LCPUFA reduces the risk of several diseases, including cardiovascular diseases. Moreover, an improvement of general health might be expected from a reduction of pro-inflammatory markers, reduced serum triglycerides, and/or a reduction in blood pressure. Recommended intakes of EPA+DHA vary from 0.15 to 0.5 En %. To meet the minimum recommended intake of most organizations, the daily intake of EPA+DHA should be at least 500 mg/day (based on a minimum daily food intake of 1500 kcal/day).

The balanced fat composition according to the invention comprises between 3.0 and 6 wt % of a combination consisting of the ω-3 poly-unsaturated fatty acids alpha-linolenic acid (ALA), docosahexaenoic acid (DHA) and eicosapentaenoic acid (EPA) wherein the amount of ALA>2.5 wt %, more preferably >2.7 wt %, or preferably ranges between 2.5 and 4.0 wt %, and the combined amount of DHA and EPA≤2.5 wt %, preferably ≤1.0 wt %.

The ω-3 poly-unsaturated fatty acids may be present as triglycerides, ethyl-esters, phospholipids, sphingolipids, glycolipids or other food grade forms.

2. Selection of the Appropriate Fat Sources with a Low LA Content

Almost all current commercial products contain the essential fatty acids linoleic acid (LA) and α-linolenic acid (ALA) to meet the minimum fatty acids requirements. However, these two fatty acids are the precursors for long-chain poly-unsaturated fatty acids (LC PUFA) that are required for normal physiological function of all tissues. The intake of omega-6 by the general population has increased during the last decades of industrialization and the overall consensus is that the Western diet now contains too much omega-6 fatty acids and not enough omega-3 fatty acids (Ailhaud et al. (2006)). This has an effect on a range of physiological and immunological functions.

Recommendations for an minimum intake of LA vary from 1 to 4% of the total caloric intake per day: the French organizations AFSSA and CNERNA-CNRS provided the highest recommendation of 4 En % for adults. None of the national committees and health councils have included a safe upper limit for LA consumption. Nevertheless, the level of LA in the fat composition that is currently used in a number of commercial products is several times higher than the intake that is considered to be adequate in order to prevent a deficiency. Reasons to limit the LA content to an amount close to the highest recommended (adequate) intake of 4 En % are discussed in the following section.

The conversion of the fatty acids LA and ALA into their respective LCPUFAs is controlled by a complex of metabolic factors and the dietary (fatty acid) composition. Among others, increasing the dietary intake of LCPUFAs reduces the conversion of LA and ALA presumably due to product down-regulation of the desaturation and elongation enzymatic pathways that are responsible for the conversion of LA and ALA (Brenna 2002). Moreover, Emken et al. (1994) nicely demonstrated that the conversion of LA as well as ALA into their respective LCPUFAs (ARA, EPA, DHA) was reduced by 40-54%, when the intake of LA was increased from 15 to 30 g/day in volunteers (Emken et al. 1994). These LA intakes corresponded to 4.7 and 9.3 En %, respectively (2800 kcal/day diets), which are in the range of normal dietary intakes and of sip and tube feeds currently on the market. To compensate the reduced endogenous production of long-chain omega-3 fatty acids, EPA and DHA should be supplied via the diet, which is another argument to include fish oil in the composition according to the invention.

High LA intakes not only reduce the conversion of LA and ALA into long-chain fatty acids, but LA also competes with ALA, EPA, as well as DHA for incorporation into tissue phospholipids: the ratio between the dietary omega-6 and omega-3 fatty acids has a strong effect on the eventual tissue composition. As a consequence, high levels of LA have a marked effect on the efficiency of fish oil supplementation. Although intakes of ARA (a downstream product of LA) play a role as well, LA is the predominant PUFA in a normal (western) diet. Hibbeln et al. (2006) compared the worldwide diversity of dietary intakes of omega-6 and omega-3 fatty acids with the risks of cardiovascular and mental illnesses and estimated a tissue target for omega-3 LCPUFAs: 60% omega-3 fatty acids in LCPUFAs (and 40% n-6 fatty acids in LCPUFAs) would be sufficient to protect 98% of the population from cardiovascular mortality. As this level is only reached in populations with extreme consumptions of fish (Japan, Greenland), the proposed a more moderate and realistic tissue target of 50% omega-3 of tissue LCPUFAs (Hibbeln et al. 2006). The 50% omega-3 target for tissue LCPUFAs for instance corresponds to an about 60% reduction of the relative risk for sudden death reported by Albert et al. (2002). By using a formula that takes into account the competition between the fatty acids for incorporation (Lands et al. 1992), the required intake of EPA+DHA was calculated to reach the 50% omega-3 target in relation to the background intake of LA (FIG. 1). This graph illustrates that the effectiveness of fish oil supplementation is enhanced when the LA intake is lowered, or in other words, the effectiveness of fish oil supplementation is strongly reduced when the LA intake is increased. For instance, a more than 3-fold higher EPA+DHA dose is needed to reach the same tissue level at an intake of 8.9 En % LA than at with a diet containing 3.2 En % LA. Knowing that LA competes with EPA and DHA for incorporation into tissues, we can now determine how the LA content of the this invention relates to the recommendations for fish intake, which are in the range of 0.2-0.5 En % EPA+DHA.

In conclusion: to make sure that the level of LA can be regarded as adequate according to all recommendations, a minimum of 4 En % LA is required (French recommendation for adults). As higher levels of LA will reduce the efficiency of fish oil supplementation and detrimentally affect the tissue omega-6/omega-3 ratio, this level of 4 En % should preferably be considered as the maximum level for nutritionally complete products. By modifying the oils currently used in production (see also next section) it is feasible to lower the LA content to 4 En %, though care should be taken to maintain the ALA content above 1 En % ALA (the highest recommended minimum intake of ALA). In this way the omega-6/omega-3 ratio of the formula can be reduced to approximately 3:1. Preferably, the ratio ω-6:ω-3 in the fat composition according to the invention is about 2.5:1-3.5:1, preferably 3:1, wherein the term about means a relative deviation of 10%.

The balanced fat composition according to the invention comprises between 10 to 15 wt % of linoleic acid (LA).

The linoleic acid may be present as triglycerides, phospholipids, sphingolipids, glycolipids or other food grade forms.

3. Inclusion of Medium-Chain Fatty Acids (MCFAs)

Most of the currently available plant oils contain LA, which makes it difficult to reduce the LA content in a fat composition to the recommended 4 En %. Without compromising the total fat content, a possible solution would be to increase other fatty acids, for example MUFAs (i.e. oleic acid). Unfortunately, available oils that are rich in MUFAs (olive oil, high-oleic sunflower oil) also contain LA, which means that an increase in the MUFA content results in an increase of the LA content as well. Instead, the saturated fatty acid content can be increased: the current saturated fatty acid contents of most of the commercial products are well below the recommended upper intakes (see Table 2). However, increasing the saturated fatty acid content cannot immediately be considered a health benefit, as it for instance increases serum cholesterol levels. One group of saturated fatty acids that can be considered as a healthier alternative are the medium-chain fatty acids (MCFAs) that are naturally found in the form of medium-chain triglycerides (MCTs). MCTs are medium-chain fatty acid esters of glycerol consisting of 3 medium-chain saturated fatty acids (MCFAs) each comprising 6 to 12 carbon atoms.

Natural sources of MCFAs are coconut oils and palm kernel oils. When hydrolyzed, these oils provide concentrated sources of MCFAs with chain lengths of primarily 8 (caprylic or octanoic acid) and 10 (capric or decanoic acid) carbon atoms. Hence, in practice, when MCTs or MCFAs are administered, this is often limited to fatty acids with 8- and 10-carbon chains, although (theoretically) MCFAs also include carbon chains of 6 and 12 carbon atoms.

Hence, the MCFAs according to the invention are preferably selected from MCTs originating from coconut oils and/or palm kernel oils. The chain length of the MCFAs according to the invention is 6, 7, 8, 9, 10, 11 or 12, preferably 8, 9 or 10, most preferably 8 or 10 carbon atoms long, or any mixture thereof.

MCFAs are not considered essential and therefore are not considered a necessary part of the normal diet. Although MCFAs are categorized as saturated fats, they have completely different biochemical and physiological properties compared to long-chain saturated fatty acids, which will be explained below.

(1) The digestion and absorption of MCFAs is easier and faster compared to long-chain fatty acids (LCFAs). MCFAs absorbed from the small intestine (intact or following hydrolysis) are primarily transported via the portal vein to the liver. In contrast, dietary long-chain triglycerides are first hydrolyzed in the small intestine to LCFAs and re-esterified in the mucosal cells of the small intestine to long-chain triglycerides. They are then incorporated into chylomicrons and reach the circulation via the lymphatic system (Bach et al. 1996; Snook et al. 1996). Moreover, the digestion and absorption of MCFAs is not dependent on pancreatic enzymes or bile salts. Particularly patients with malabsorption syndromes and/or pancreatic insufficiency will benefit from a diet rich in MCTs/MCFAs and MCFAs are therefore often used as the preferred fat source for these patients (Marten et al. 2006).

(2) MCFAs readily cross the mitochondrial membrane and are rapidly oxidized (beta-oxidation). This is (in part) due to the fact that fatty acids containing 6 to 12 carbons do not require carnitine to cross the mitochondrial membrane in liver tissue of healthy well-nourished adults, which is in contrast to the carnitine-dependent beta-oxidation of fatty acids with 14 carbon atoms or more (Calabrese et al. 1999). Beta-oxidation of fatty acids results in the production of acetyl-CoA that enters the Kreb's cycle to produce energy, but acetyl-CoA can also be converted into to acetoacetate, beta-hydroxybutyrate, and acetone, collectively called ketone bodies. The rapid uptake of MCFAs into mitochondria can lead to an excess production of acetyl-CoA and a high production of ketone bodies (ketogenic effect), which can be further metabolized in the liver, but may also be transported by the systemic circulation to other tissues to serve as a directly available energy source (Marten et al. 2006).

(3) The preferred β-oxidation of MCFA by mitochondria might protect PUFA from oxidation, which would increase the availability of EPA and DHA for incorporation into tissue phospholipids. A small number of studies have indeed suggested the existence of such an effect. For instance, in one study preterm infants were enterally fed and received either a formula with 40% MCFA (MCT) or one without MCFA for 7 days (Rodriguez et al. 2003). After this period the oxidation of a standard dose of labeled LA was significantly reduced in the MCFA-treated group. Similarly, parenteral administration of an emulsion with MCFA combined with long-chain triglycerides (ratio 1:1) for 8 days resulted in slightly elevated LCPUFA levels in plasma phospholipids and triacylglycerides compared to an emulsion with only PUFAs in another study with preterm infants (Lehner et al. 2006). However, evidence of the protection of PUFAs by providing MCTs/MCFAs in adults is limited.

(4) The preference for β-oxidation of MCFAs by mitochondria for energy production is higher compared to LCFAs, which (theoretically) means less fatty acids are stored in adipose tissue when provided as MCFAs and more is used to generate energy (Metges et al. 1991).

The amount of MCFA or MCT required to reduce the LA content is relatively small: e.g. for a commercial product like Nutrison Standard (NV Nutricia) about 4 En % of MCFAs (C8+C10) is sufficient—together with a modification of other vegetable oil sources—to reduce the LA content from 8.3 to 4 En %. This would correspond to approximately 10 to 15% of the fat composition as MCFA, or 6-8 g MCFA (C8+C10) per day (1500 kcal/day). At these levels, gastrointestinal discomfort is not likely to occur, as much higher levels have been reported to be well tolerated. For instance, a diet with 40 En % fat, of which 50% consisted of MCT, was generally well tolerated, though minor gastrointestinal discomfort and occasional nausea were reported during the first few days of consumption (Bourque et al. 2003). Similarly, a diet with as much as 67% of the fat as MCT (40 En % fat) was reported to be tolerated by volunteers (St-Onge et al. 2003).

In conclusion, to help lower the LA content of the fat composition, the overall PUFA can be lowered by increasing the amount of saturated fat: the total saturated fatty acid content of most of the current commercial products is low (<5 En %) and can be increased within the upper recommended levels (10-12 En %). Although MCFAs are categorised as saturated fat, these fatty acids are easily digestible and are rapidly oxidized to yield energy, in contrast to long-chain fatty acids that are stored in adipose tissue. The inclusion of MCTs/MCFAs can be used as a healthy way of reducing the LA content of the products (within limits). Only small amounts of MCT/MCFA (10-15% of the fat composition) are required to lower the LA content to the desired level of 4 En %, provided that other vegetable oils are modified as well.

The balanced fat composition according to the invention comprises between 10 to 20 wt % preferably 14 to 18 wt %, most preferably 15.7 to 16.2 wt % of medium-chain fatty acids (MCFA).

The medium-chain fatty acids may be present as triglycerides, phospholipids, sphingolipids, glycolipids or other food grade forms.

4. Inclusion of a Source Rich in Mono-Unsaturated Fatty Acids (MUFAs)

Unsaturated fatty acids are sensitive to oxidation, which leads to the production of damaging oxygen radicals and oxidative damage to surrounding molecules and cells. As the sensitivity for oxidation of fatty acids depends on the number of double bonds in the fatty acid carbon chain, mono-unsaturated fatty acids (MUFAs) are less susceptible to oxidation than polyunsaturated fatty acids.

The development of atherosclerosis, a chronic inflammatory response in the walls of arteries, is triggered by the deposition of lipoproteins (plasma proteins that carry cholesterol and triglycerides) to the arterial wall. Oxidized Low-density lipoprotein (LDL) is believed to be more damaging to the arterial wall than native LDL and oxidation of LDL contributes to the development of atherosclerosis. Elevated concentrations of circulating oxidized LDL show a positive relationship with the severity of acute coronary events and are predictors for CHD both in CHD patients and in the general population (Covas, 2007).

Replacement of saturated fatty acids with oleic acid reduces the risk of developing CHD, among others by incorporation of oleic acid at the expense of linoleic acid (C18:2n-6), which reduces the sensitivity of LDL to oxidation (Reaven et al., 1993; Covas, 2007). Moreover, the total LDL concentration in the blood, as well as factor VII coagulation activity, decrease when foods rich in saturated fat are replaced with foods rich in high-oleic acid sunflower oil in middle-aged men and women within a matter of weeks (Allman-Farinelli et al., 2005).

The mono-unsaturated fatty acid is preferably selected from the group of palmitoleic acid (16:1), oleic acid (18:1), eicosaenoic acid (20:1), erucic acid (22:1), nervoic acid (24:1) or mixtures thereof. Most preferably, the mono-unsaturated fatty acid comprises oleic acid. Most preferably, at least 80 wt % of the mono-unsaturated fatty acid is oleic acid.

The balanced fat composition according to the invention comprises between 35 to 79 wt %, preferably 50 to 70 wt %, most preferably 50 to 60 wt % of at least one mono-unsaturated fatty acid.

Suitable sources to increase the MUFA content are for example high oleic sunflower oil, high oleic safflower oil, and olive oil.

The mono-unsaturated fatty acids may be present as triglycerides, phospholipids, sphingolipids, glycolipids or other food grade forms.

Balanced Fat Composition

When referred to as the balanced fat composition according to the invention, the fat composition may be available as a combination or mixture as such, it may be available as a set of components in a defined concentration in a nutritional composition, it may be manufactured as such, or it may be manufactured by adding the different components LA, ALA, DHA, EPA, MCFA and MUFA, or sources comprising said components together with other ingredients to produce a nutritional composition comprising the fat composition according to the invention. It may also be available as a kit of parts, comprising the separate components LA, ALA, DHA, EPA, MCFA and MUFA, or sources comprising said components to be combined together in the defined amounts, optionally accompanied by instructions how to do so.

The fat composition according to the invention may further comprise a further fatty acid, preferably a fatty acid selected from the group of saturated fatty acids other than MCFA and poly-unsaturated fatty acids other than ALA, DHA and EPA.

The fat composition according to the invention may be manufactured by a skilled person by combining the appropriate fat sources in appropriate amounts. According to one embodiment, the following sources can be combined: Canola oil, high oleic sunflower oil, fish oil and MCT oil. More in particular are combined: about 37 wt % of Canola oil, about 42 wt % of high oleic sunflower oil, about 2 wt % of fish oil and about 17 wt % of MCT oil. It will be obvious to the skilled person that the amounts given above may vary to a certain extent depending on the specific composition of the fat source.

Nutritional Composition

Surprisingly, the balanced fat composition according to the invention makes it possible to produce a liquid enteral nutritional composition with a long shelf life and with a low viscosity. Hence, the invention also pertains to a balanced fat composition according to the invention for use in the manufacture of a liquid nutritional composition, in particular for use as a tube feed, most in particular for long-term tube feeding.

In one particular embodiment, the invention relates to a liquid nutritional composition comprising a fat composition which comprises 8 to 15 wt %, preferably 12.5 to 14.5 wt %, most preferably 13.5 to 13.9 wt % of linoleic acid (LA);

3.0 to 6.0 wt %, preferably 4.0 to 5.0 wt %, most preferably 4.3 to 4.7 wt % of a combination consisting of the ω-3 poly-unsaturated fatty acids alpha-linolenic acid (ALA), docosahexaenoic acid (DHA) and eicosapentaenoic acid (EPA), wherein the amount of ALA>2.5 wt %, more preferably >2.7 wt %, or preferably ranges between 2.5 and 4.0 wt %, and the combined amount of DHA and EPA≤2.5 wt %, preferably ≤1.0 wt %; and 10 to 20 wt %, preferably 14 to 18 wt %, most preferably 15.7 to 16.2 wt % of at least one medium-chain fatty acid (MCFA, e.g., 8:0 and/or 10:0); and 35 to 79 wt %, preferably 40 to 70 wt %, most preferably 50 to 60 wt % of at least one mono-unsaturated fatty acid (MUFA, e.g. 16:1, 18:1, 20:1, 22:1 and/or 24:1).

wherein all relative amounts are calculated based on the total amount of fatty acids in the fat composition. The relative amounts do not need to add up to 100 wt % as the balanced fat composition according to the invention may also include other types of fat. However, the balanced fat composition according to the invention should not substantially contain other components which cannot be classified as fats according to the skilled person.

Preferably, the liquid nutritional composition according to the invention comprises the balanced fat composition according to the invention, which balanced fat composition comprises at least between 30 and 50 En %, preferably between 30 and 40 En % of the total energy of the composition.

Preferably, the liquid nutritional composition according to the invention comprises at least 0.4 kcal/ml, preferably at least 0.7 kcal/ml, more preferably at least 0.9 kcal/ml of composition.

The composition according to the invention is designed to either supplement a person's diet or to provide complete nutritional support. Hence, the composition according to the invention may further comprise at least protein and/or carbohydrate and/or a source of vitamins and minerals and/or a source of prebiotics. Preferably, the composition according the invention is a nutritionally complete composition.

Viscosity

In one embodiment of the present invention, the viscosity of the liquid enteral nutritional composition is lower than 500 mPa·s, measured at 20° C. (i.e. room temperature) at a shear rate of 100 s$^{-1}$, preferably between 10 and 200 mPa·s, more preferably between 10 and 100 mPa·s, most preferably below 50 mPa·s. The viscosity may suitably be determined using a rotational viscosity meter using a cone/plate geometry. This viscosity is ideal for orally administering the liquid enteral nutritional composition according to the invention because a person may easily consume a serving having a low viscosity such as that displayed by the present invention. This viscosity is also ideal for unit dosages that are tube fed.

In one embodiment of the present invention, the density of the composition ranges between 1.00 g/ml and 1.20 g/ml, especially between 1.05 g/ml and 1.15 g/ml.

Dosage Unit

The liquid enteral nutritional composition according to the invention preferably has the form of a complete food, i.e. it can meet all nutritional needs of the user. As such, the liquid enteral nutritional composition according to the invention preferably contains 1000 to 2500 kcal per daily dosage. Depending on the condition of the patient, a daily dose is about 25 to 35 kcal/kg bodyweight/day. Therefore, a typical daily dose for a 70 kg person contains about 2000 kcal. The complete food can be in the form of multiple dosage units, e.g. from 8 (250 ml/unit) to 2 units (1 l/unit) per day for an energy supply of 2000 kcal/day using a liquid enteral nutritional composition according to the invention of 1.0 kcal/ml. Preferably, the nutritional composition is adapted for tube feeding.

The liquid enteral nutritional composition can also be an oral food supplement, for example to be used in addition to a non-medical food or normal diet. Preferably, as an oral supplement, the liquid enteral nutritional composition contains per daily dosage less than 1500 kcal, in particular as a supplement, the liquid enteral nutritional composition contains 500 to 1000 kcal per daily dose. The food supplement can be in the form of multiple dosage units, e.g. from 2 (250 ml/unit) to 10 units (50 ml/unit) per day for an energy supply of 500 kcal/day using a liquid enteral nutritional composition according to the invention of 1.0 kcal/ml.

Preferably, the nutritional composition is packaged, stored and provided in a container such as plastic bag or a pouch or the like. A variety of such containers is known, for example 500 ml, 1000 ml, and 1500 ml containers are known in the art. It should be noted that any suitable container can be used to package, store and provide the nutritional composition according to the invention.

In one embodiment of the present invention, the composition is provided in a ready to use liquid form and does not require reconstitution or mixing prior to use. The composition according to the invention can be tube fed or administered orally. For example, the composition according to the invention can be provided in a can, on spike, and hang bag. However, a composition may be provided to a person in need thereof in powder form, suitable for reconstitution using an aqueous solution or water such that the composition according to the invention is produced.

Thus in one embodiment of the present invention, the present composition is in the form of a powder, accompanied with instructions to dissolve or reconstitute in an aqueous composition or water to arrive at the liquid nutritional enteral composition according to the present invention. In one embodiment of the present invention, the present liquid nutritional enteral composition may thus be obtained by dissolving or reconstituting a powder, preferably in an aqueous composition, in particular water.

In one embodiment of the present invention, the composition according to the invention is packaged. The packaging may have any suitable form, for example a block-shaped carton, e.g. to be emptied with a straw; a carton or plastic beaker with removable cover; a small-sized bottle for example for the 80 ml to 200 ml range, and small cups for example for the 10 ml to 30 ml range. Another suitable packaging mode is inclusion of small volumes of liquid (e.g. 10 ml to 20 ml) in edible solid or semi-solid hulls or capsules, for example gelatine-like coverings and the like. Another suitable packaging mode is a powder in a container, e.g. a sachet, preferably with instructions to dissolve or reconstitute in an aqueous composition or water.

Effectivity

The present invention also concerns a method of providing nutrition to a person in need thereof, comprising administering to said person an effective amount of the nutritional composition according to the present invention comprising the balanced fat composition according to the invention. Said person may be an elderly person, a person that is in a disease state, a person that is recovering from a disease state, or a person that is malnourished.

The present invention is also related to providing long-term tub-fed nutrition to patients in need thereof. As used herein, the term "long-term" means greater than one month (30 days). It is obvious that nutrition, when suitable for long-term nutrition, is also suitable for any other shorter period of nutrition, such as medium-term nutrition (10 to 30 days) and short-term nutrition (between 1 and 10 days). However, tube nutrition is designed for maintenance patients. As used herein, "maintenance patient" refers to an patient, being any human of any age, in particular children, adults and elderly, who is unable to receive nutrition through a normal diet but who is normo-metabolic, i.e. not suffering from a metabolic disorder. As used herein, the term "normal diet" means to receive at least substantially all nutrition by eating, i.e. e.g. orally, by eating or drinking Because the long term enteral nutritional composition according to the invention is provided for maintenance, it is not directed to treatment of any specific disorder, such as cancer, HIV, diabetes, e.a. Patients are typically stable, normo-metabolic, healthy patients except for the fact that they require enteral nutrition in order to meet the necessary nutritional requirements. Hence, these patients may suffer from a variety of disorders including swallowing disorders of a variety of etiologies, particularly surgical consequences of ear/nose/throat cancer, and patients suffering from a cerebral vascular accident.

The invention will now be further elucidated by several examples, without being limited thereby.

LIST OF FIGURES

FIG. 1:

The effect of the background consumption of omega-6 linoleic acid (LA) on the efficiency of dietary supplementation with omega-3 LCPUFAs to reach the target of 50% of the tissue LCPUFAs consisting of omega-3 fatty acids. At this level a substantial reduction of the risk of cardiovascular mortality is expected. The highest intake of LA refers to the general consumption in the United States, while the lowest level of LA corresponds to the intake in the Philippines estimated from commodities data for the domestic supply of foods for human consumption. The required intakes of omega-3 LCPUFAs are calculated from an empirical formula that takes into account the competition of the various PUFAs for incorporation into tissues. The graph is based on data from Hibbeln et al. 2006.

EXAMPLES

The following balanced fat composition can suitably be used in an enteral composition according to the invention (Tables 4 and 5).

TABLE 4

Fat composition according to the invention

| | Fat composition (g per 100 g fatty acids) |
|---|---|
| Total fatty acids | 100 g |
| Saturated fatty acids | 25.7 g |
| MCFA | 15.8 g |
| Unsaturated fatty acids | 74.3 g |
| MUFA | 55.9 g |
| PUFA | 18.4 g |
| LA | 13.6 g |
| ALA | 3.6 g |
| LA/ALA | 3.8:1 |
| EPA + DHA | 0.9 g |
| ALA + EPA + DHA | 4.5 g |
| Total ω-6 | 13.8 g |
| Total ω-3 | 4.7 g |
| ω-6/ω-3 | 2.9:1 |

TABLE 5

Enteral compositions according to the invention

| Component | Ex. 1 Adult tube feed | Ex. 2 Adult tube feed | Ex. 3 Adult tube feed |
|---|---|---|---|
| Energy value (kcal/100 ml) | 100 | 150 | 240 |
| Protein (g/100 ml) | 4 (16 En %) | 6 (16 En %) | 9.6 (16 En%) |
| Carbohydrates (g/100 ml) | 12.3 (49 En %) | 18.3 (49 En %) | 29.7 (49 En %) |
| Fat (g/100 ml) | 3.9* (35 En %) | 5.8* (35 En %) | 9.3* (35 En %) |
| Saturated fat | 1.0 | 1.5 | 2.4 |
| MCFA | 0.6 | 0.9 | 1.4 |
| Unsaturated fat | 2.9 | 4.3 | 6.9 |
| MUFA | 2.2 | 3.2 | 5.2 |
| PUFA | 0.7 | 1.1 | 1.7 |
| LA | 0.5 | 0.8 | 1.3 |
| ALA | 0.1 | 0.2 | 0.3 |
| EPA + DHA | 0.03 | 0.03 | 0.03 |
| ALA + EPA + DHA | 0.16 | 0.23 | 0.35 |
| ω3-6/ω3-3 | 2.9:1 | 3.1:1 | 3.1:1 |
| Viscosity (mPa · s) | 18 | 35 | 70-85 |
| Density (kg/l) | 1.1 | 1.1 | 1.1 |

*in these examples 3.9 g fat equals 3.7 g fatty acids; 5.8 g fat equals 5.5 g fatty acids; 9.3 g fat equals 8.7 g fatty acids.

It should be understood that various changes and modifications to the presently preferred embodiments described herein will be apparent to those skilled in the art. Such changes and modifications may be made without departing from the gist and scope of the invention and without diminishing its advantages. It is therefore intended that such changes and modifications are covered by the appended claims.

REFERENCES

Ailhaud, G., F. Massiera, P. Weill, P. Legrand, J. M. Alessandri and P. Guesnet (2006). "Temporal changes in dietary fats: role of n-6 polyunsaturated fatty acids in excessive adipose tissue development and relationship to obesity." Prog Lipid Res 45(3): 203-36.

Albert, C. M., H. Campos, M. J. Stampfer, P. M. Ridker, J. E. Manson, W. C. Willett and J. Ma (2002). "Blood levels of long-chain n-3 fatty acids and the risk of sudden death." N Engl J Med 346(15): 1113-8.

Allman-Farinelli, M. A., K. Gomes, et al. (2005). "A diet rich in high-oleic-acid sunflower oil favorably alters low-density lipoprotein cholesterol, triglycerides, and factor VII coa-gulant activity." J Am Diet Assoc 105(7): 1071-9.

Bach, A. C., Y. Ingenbleek and A. Frey (1996). "The usefulness of dietary medium-chain triglycerides in body weight control: fact or fancy?" J Lipid Res 37(4): 708-26.

Bemelmans, W. J., J. Broer, E. J. Feskens, A. J. Smit, F. A. Muskiet, J. D. Lefrandt, V. J. Bom, J. F. May and B. Meyboom-de Jong (2002). "Effect of an increased intake of alpha-linolenic acid and group nutritional education on cardiovascular risk factors: the Mediterranean Alpha-linolenic Enriched Groningen Dietary Intervention (MARGARIN) study." Am J Clin Nutr 75(2): 221-7.

Bourque, C., M. P. St-Onge, A. A. Papamandjaris, J. S. Cohn and P. J. Jones (2003). "Consumption of an oil composed of medium chain triacyglycerols, phytosterols, and N-3 fatty acids improves cardiovascular risk profile in overweight women." Metabolism 52(6): 771-7.

Brenna, J. T. (2002). "Efficiency of conversion of alpha-linolenic acid to long chain n-3 fatty acids in man." Curr Opin Clin Nutr Metab Care 5(2): 127-32.

Burdge, G. C. and S. A. Wootton (2002). "Conversion of alpha-linolenic acid to eicosapentaenoic, docosapentaenoic and docosahexaenoic acids in young women." Br J Nutr 88(4): 411-20.

Calabrese, C., S. Myer, S. Munson, P. Turet and T. C. Birdsall (1999). "A cross-over study of the effect of a single oral feeding of medium chain triglyceride oil vs. canola oil on post-ingestion plasma triglyceride levels in healthy men." Altern Med Rev 4(1): 23-8.

Calder, P. C. (2006). "n-3 polyunsaturated fatty acids, inflammation, and inflammatory diseases." Am J Clin Nutr 83(6 Suppl): 1505S-1519S.

Carnielli, V. P., G. Verlato, F. Pederzini, I. Luijendijk, A. Boerlage, D. Pedrotti and P. J. Sauer (1998). "Intestinal absorption of long-chain polyunsaturated fatty acids in preterm infants fed breast milk or formula." Am J Clin Nutr 67(1): 97-103.

Covas, M. I. (2007). "Olive oil and the cardiovascular system." Pharmacol Res 55(3): 175-86.

Chrysohoou, C., D. B. Panagiotakos, C. Pitsavos, J. Skoumas, X. Krinos, Y. Chloptsios, V. Nikolaou and C. Stefanadis (2007). "Long-term fish consumption is associated with protection against arrhythmia in healthy persons in a Mediterranean region—the ATTICA study." Am J Clin Nutr 85(5): 1385-91.

Davidson, M. H., K. C. Maki, J. Kalkowski, E. J. Schaefer, S. A. Torri and K. B. Drennan (1997). "Effects of docosahexaenoic acid on serum lipoproteins in patients with combined hyperlipidemia: a randomized, double-blind, placebo-controlled trial." J Am Coll Nutr 16(3): 236-43.

Deutsche Gesellschaft für Ernährung e. V. (2006). Evidenzbasierte Leitlinie: Fettkonsum and Prävention ausgewählter ernährungsmitbnedingter Krankheiten. Bonn.

Emken, E. A., R. O. Adlof and R. M. Gulley (1994). "Dietary linoleic acid influences desaturation and acylation of deuterium-labeled linoleic and linolenic acids in young adult males." Biochim Biophys Acta 1213(3): 277-88.

Gerster, H. (1998). "Can adults adequately convert alpha-linolenic acid (18:3n-3) to eicosapentaenoic acid (20:5n-3) and docosahexaenoic acid (22:6n-3)?" Int J Vitam Nutr Res 68(3): 159-73.

Goyens, P. L., M. E. Spilker, P. L. Zock, M. B. Katan and R. P. Mensink (2006). "Conversion of alpha-linolenic acid in humans is influenced by the absolute amounts of alpha-linolenic acid and linoleic acid in the diet and not by their ratio." Am J Clin Nutr 84(1): 44-53.

Hansen, J. B., J. O. Olsen, L. Wilsgard, V. Lyngmo and B. Svensson (1993). "Comparative effects of prolonged intake of highly purified fish oils as ethyl ester or triglyceride on lipids, haemostasis and platelet function in normolipaemic men." Eur J Clin Nutr 47(7): 497-507.

Health Council of the Netherlands (2006). Guidelines for a healthy diet 2006. publication nr. 2006/21. The Hague.

Hibbeln, J. R., L. R. Nieminen, T. L. Blasbalg, J. A. Riggs and W. E. Lands (2006). "Healthy intakes of n-3 and n-6 fatty acids: estimations considering worldwide diversity." Am J Clin Nutr 83(6 Suppl): 1483S-1493S.

ISSFAL (2004). Recommendations for intake of polyunsaturated fatty acids in healthy humans. Brighton, International Society for the Study of Fatty Acids and Lipids.

Lands, W. E., B. Libelt, A. Morris, N. C. Kramer, T. E. Prewitt, P. Bowen, D. Schmeisser, M. H. Davidson and J. H. Burns (1992). "Maintenance of lower proportions of (n-6) eicosanoid precursors in phospholipids of human plasma in response to added dietary (n-3) fatty acids." Biochim Biophys Acta 1180(2): 147-62.

Lehner, F., H. Demmelmair, W. Roschinger, T. Decsi, M. Szasz, K. Adamovich, R. Arnecke and B. Koletzko (2006). "Metabolic effects of intravenous LCT or MCT/LCT lipid emulsions in preterm infants." J Lipid Res 47(2): 404-11.

Luley, C., H. Wieland and J. Grunwald (1990). "Bioavailability of omega-3 fatty acids: ethyl ester preparations are as suitable as triglyceride preparations." Akt.Ernähr.-Med. 15: 123-5.

Marten, B., M. Pfeuffer and J. Schrezenmeier (2006). "Medium-chain triglycerides." International Dairy Journal 16: 1374-82.

Metges, C. C. and G. Wolfram (1991). "Medium- and long-chain triglycerides labeled with 13C: a comparison of oxidation after oral or parenteral administration in humans." J Nutr 121(1): 31-6.

Mozaffarian, D., A. Geelen, I. A. Brouwer, J. M. Geleijnse, P. L. Zock and M. B. Katan (2005). "Effect of fish oil on heart rate in humans: a meta-analysis of randomized controlled trials." Circulation 112(13): 1945-52.

Reaven, P., S. Parthasarathy, et al. (1993). "Effects of oleate-rich and linoleate-rich diets on the susceptibility of low density lipoprotein to oxidative modification in mildly hyper-cholesterolemic subjects." J Clin Invest 91(2): 668-76.

Rodriguez, M., S. Funke, M. Fink, H. Demmelmair, M. Turini, G. Crozier and B. Koletzko (2003). "Plasma fatty acids and [13C]linoleic acid metabolism in preterm infants fed a formula with medium-chain triglycerides." J Lipid Res 44(1): 41-8.

Sala-Vila, A., C. Campoy, A. I. Castellote, F. J. Garrido, M. Rivero, M. Rodríguez-Palmero and M. C. López-Sabater (2006). "Influence of dietary source of docosahexaenoic and arachidonic acids on their incorporation into membrane phospholipids of red blood cells in term infants." Prostaglandins Leukot Essent Fatty Acids 74(2): 143-8.

Sala-Vila, A., A. I. Castellote, C. Campoy, M. Rivero, M. Rodriguez-Palmero and M. C. Lopez-Sabater (2004). "The source of long-chain PUFA in formula supplements does not affect the fatty acid composition of plasma lipids in full-term infants." J Nutr 134(4): 868-73.

Schwellenbach, L. J., K. L. Olson, K. J. McConnell, R. S. Stolcpart, J. D. Nash and J. A. Merenich (2006). "The triglyceride-lowering effects of a modest dose of docosahexaenoic acid alone versus in combination with low dose eicosapentaenoic acid in patients with coronary artery disease and elevated triglycerides." J Am Coll Nutr 25(6): 480-5.

Serhan, C. N. (2006). "Novel chemical mediators in the resolution of inflammation: resolvins and protectins." Anesthesiol Clin 24(2): 341-64.

Sijben, J. W. and P. C. Calder (2007). "Differential immunomodulation with long-chain n-3 PUFA in health and chronic disease." Proc Nutr Soc 66(2): 237-59.

Snook, J. T., S. Park, G. Wardlaw, R. Jandacek, D. Palmquist, M.-S. Lee and J. Hoover (1996). "Chylomicron fatty acid composition and serum lipid concentrations in subjects fed caprenin or palm oil/palm kernel oil as the major dietary fat." Nutrition Research 16(6): 925-36.

St-Onge, M. P., C. Bourque, P. J. Jones, R. Ross and W. E. Parsons (2003a). "Medium-versus long-chain triglycerides for 27 days increases fat oxidation and energy expenditure without resulting in changes in body composition in overweight women." Int J Obes Relat Metab Disord 27(1): 95-102.

Tapiero, H., G. N. Ba, P. Couvreur and K. D. Tew (2002). "Polyunsaturated fatty acids (PUFA) and eicosanoids in human health and pathologies." Biomed Pharmacother 56(5): 215-22.

Theobald, H. E., A. H. Goodall, N. Sattar, D. C. Talbot, P. J. Chowienczyk and T. A. Sanders (2007). "Low-dose docosahexaenoic acid lowers diastolic blood pressure in middle-aged men and women." J Nutr 137(4): 973-8.

Williams, C. M. and G. Burdge (2006). "Long-chain n-3 PUFA: plant v. marine sources." Proc Nutr Soc 65(1): 42-50.

Zampelas, A., D. B. Panagiotakos, C. Pitsavos, U. N. Das, C. Chrysohoou, Y. Skoumas and C. Stefanadis (2005). "Fish consumption among healthy adults is associated with decreased levels of inflammatory markers related to cardiovascular disease: the ATTICA study." J Am Coll Cardiol 46(1): 120-4.

The invention claimed is:

1. A composition suitable for tube feeding, comprising:
   (a) 8 to 13.9 wt % of linoleic acid (LA);
   (b) 4.0 to 6.0 wt % of a combination of ω-3 poly-unsaturated fatty acids alpha-linolenic acid (ALA), docosahexaenoic acid (DHA) and eicosapentaenoic acid (EPA), wherein the amount of ALA is between 2.5 and 4.0 wt % and the combined amount of DHA and EPA is ≤2.5 wt %;
   (c) 10 to 20 wt % of at least one medium-chain fatty acid (MCFA); and
   (d) 35 to 79 wt % of at least one mono-unsaturated fatty acid (MUFA).

2. The composition according to claim 1, comprising 13.5 to 13.9 wt % of LA.

3. The composition according to claim 1, comprising 4.0 to 5.0 wt % of the combination of ω-3 poly-unsaturated fatty acids.

4. The composition according to claim 3, comprising 4.3 to 4.7 wt % of the combination of ω-3 poly-unsaturated fatty acids.

5. The composition according to claim 1, wherein the combined amount of DHA and EPA is ≤1.0 wt %.

6. The composition according to claim 1, comprising 14 to 18 wt % of at least one medium-chain fatty acid.

7. The composition according to claim 6, comprising 15.7 to 16.2 wt % of at least one medium-chain fatty acid.

8. The composition according to claim 1, comprising 40 to 70 wt % of at least one mono-unsaturated fatty acid.

9. The composition according to claim 1, comprising 50 to 60 wt % of at least one mono-unsaturated fatty acid.

10. The composition according to claim 1, wherein the mono-unsaturated fatty acid comprises oleic acid (18:1).

11. The composition according to claim 1, wherein the ratio ω-6:ω-3 is about 3:1.

12. The composition according to claim 1, prepared from combining appropriate amounts of canola oil, high oleic sunflower oil, fish oil and medium chain triglyceride (MCT) oil.

13. The composition according to claim 1, prepared from combining about 37 wt % of Canola oil, about 42 wt % of high oleic sunflower oil, about 2 wt % of fish oil and about 17 wt % of MCT oil.

14. A liquid nutritional composition, having between 30 and 50 en % of the total energy of the composition derived from the composition of claim 1.

15. The liquid nutritional composition according to claim 14, having an energy content of at least 0.4 kcal/ml.

16. A method for providing nutrition to a person in need thereof, comprising administering by tube feed to the person a liquid nutritional composition comprising the composition according to claim 1, wherein the person in need thereof is a human who does not suffer from a metabolic disorder yet requires enteral nutrition in order to meet nutrition requirements.

17. The composition according to claim 1, comprising 35-79 wt % of 16:1, 18:1, 20:1, 22:1 and/or 24:1 MUFAs.

18. The composition according to claim 1, comprising 10-20 wt % of 8:0 and/or 10:0 MCFAs.

19. The composition according to claim 1, comprising 14-20 wt % of 8:0 and/or 10:0 MCFAs.

\* \* \* \* \*